US012412136B2

(12) United States Patent
Mukherjee et al.

(10) Patent No.: US 12,412,136 B2
(45) Date of Patent: Sep. 9, 2025

(54) ENERGY OPTIMIZATION PLATFORM FOR CRYPTOCURRENCY MINING

(71) Applicant: Bank of America Corporation, Charlotte, NC (US)

(72) Inventors: Maharaj Mukherjee, Poughkeepsie, NY (US); George Albero, Charlotte, NC (US); Jinna Kim, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 95 days.

(21) Appl. No.: 17/953,541

(22) Filed: Sep. 27, 2022

(65) Prior Publication Data

US 2024/0104460 A1 Mar. 28, 2024

(51) Int. Cl.
*G06Q 10/0631* (2023.01)
*G06Q 10/04* (2023.01)
*H04L 9/00* (2022.01)

(52) U.S. Cl.
CPC ....... *G06Q 10/06313* (2013.01); *G06Q 10/04* (2013.01); *H04L 9/50* (2022.05); *H04L 2209/56* (2013.01)

(58) Field of Classification Search
None
See application file for complete search history.

(56) References Cited

U.S. PATENT DOCUMENTS

| | | | |
|---|---|---|---|
| 9,104,435 B2 | 8/2015 | Potkonjak | |
| 9,326,236 B2 | 4/2016 | Ligman et al. | |
| 9,326,237 B2 | 4/2016 | Ligman et al. | |
| 9,552,234 B2 | 1/2017 | Boldyrev et al. | |
| 9,648,636 B2 | 5/2017 | Elfstrom et al. | |
| 10,110,003 B2 | 10/2018 | Stalker | |
| 10,290,289 B2 | 5/2019 | Jahagirdar et al. | |
| 10,331,191 B2 | 6/2019 | Potkonjak | |

(Continued)

OTHER PUBLICATIONS

Gundaboina, Lokesh, Sumit Badotra, and Sarvesh Tanwar. "Energy and resource consumption in cryptocurrency mining: A detailed comparison." 2021 9th International Conference on Reliability, Infocom Technologies and Optimization (Trends and Future Directions)(ICRITO). IEEE, 2021 (Year: 2021).*

(Continued)

*Primary Examiner* — Darlene Garcia-Guerra
(74) *Attorney, Agent, or Firm* — Banner & Witcoff, Ltd.

(57) ABSTRACT

Aspects of the disclosure relate to energy optimization. A computing platform may receive a cryptocurrency request indicating a gas price and KPIs of the cryptocurrency request. The computing platform may input the gas price and the KPIs into a mining optimization model, which may cause the mining optimization model to output an energy mix for use in processing the cryptocurrency request. The energy mix may indicate energy sources, capable of providing an amount of energy needed to process the cryptocurrency request and used to support operation of a data center configured to process cryptocurrency requests, and a cost of the amount of energy from the energy mix may be less than a cost of the amount of energy from other available energy sources. The computing platform may send commands directing the data center to process the cryptocurrency request using the energy mix, which may cause it to do so.

20 Claims, 10 Drawing Sheets

(56) References Cited

U.S. PATENT DOCUMENTS

| | | |
|---|---|---|
| 10,490,170 B2 | 11/2019 | Jahagirdar et al. |
| 10,660,241 B2 | 5/2020 | Brunstetter |
| 10,705,580 B2 | 7/2020 | Gross et al. |
| 10,732,584 B2 | 8/2020 | ElBsat et al. |
| 11,022,947 B2 | 6/2021 | ElBsat et al. |
| 11,068,821 B2 | 7/2021 | Wenzel et al. |
| 11,081,091 B2 | 8/2021 | Jahagirdar et al. |
| 11,159,022 B2 | 10/2021 | Lee et al. |
| 11,163,271 B2 | 11/2021 | Lee et al. |
| 11,182,714 B2 | 11/2021 | Wenzel et al. |
| 11,188,977 B2 * | 11/2021 | Youb .................. G06Q 30/0645 |
| 11,226,125 B2 | 1/2022 | Hogan et al. |
| 11,418,402 B1 * | 8/2022 | Jakobsson ............. H04L 41/044 |
| 11,424,643 B2 | 8/2022 | Islam et al. |
| 2010/0006087 A1 * | 1/2010 | Gilon ...................... F24S 50/20 126/572 |
| 2012/0153725 A1 * | 6/2012 | Grohman ............... H01Q 1/243 307/39 |
| 2016/0006066 A1 * | 1/2016 | Robertson ............... C25B 15/08 429/417 |
| 2019/0378069 A1 * | 12/2019 | Deshpande ...... G06Q 10/06315 |
| 2020/0296093 A1 * | 9/2020 | Hoyos .................. H04L 9/3247 |
| 2020/0409756 A1 * | 12/2020 | Beaty ...................... G06F 9/505 |
| 2023/0137653 A1 * | 5/2023 | Dresselhuys ............ H02J 3/381 700/291 |
| 2023/0168944 A1 * | 6/2023 | Karlin ...................... G06F 9/505 718/104 |
| 2023/0214703 A1 * | 7/2023 | Maheswari ............ G06N 3/088 700/291 |
| 2023/0222388 A1 * | 7/2023 | Cella ...................... G06N 20/00 706/12 |
| 2023/0306418 A1 * | 9/2023 | Purandare .......... G06Q 20/3827 |
| 2024/0015005 A1 * | 1/2024 | Song .................... H04L 9/0643 |

OTHER PUBLICATIONS

Nikzad, Amirhossein, and Mahmood Mehregan. "Techno-economic, and environmental evaluations of a novel cogeneration system based on solar energy and cryptocurrency mining." Solar Energy 232 (2022): 409-420 (Year: 2022).*

Bastian-Pinto, Carlos L., et al. "Hedging renewable energy investments with Bitcoin mining." Renewable and Sustainable Energy Reviews 138 (2021): 110520 (Year: 2021)*

* cited by examiner

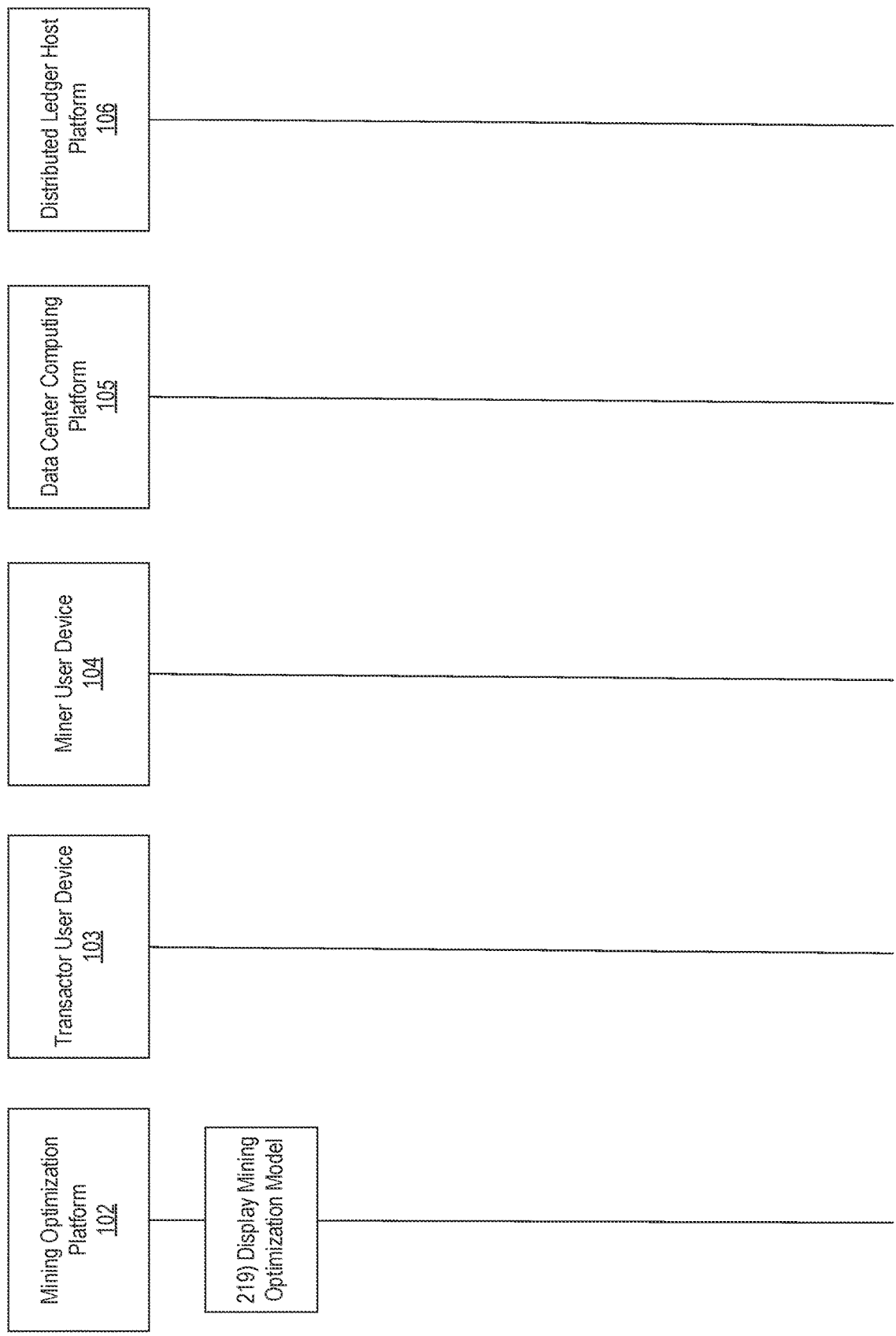

ENERGY OPTIMIZATION PLATFORM FOR CRYPTOCURRENCY MINING

BACKGROUND

Aspects of the disclosure relate to energy optimization. In some instances, mining for digital assets (e.g., cryptocurrency, or the like) may be an energy intensive process. Such large amounts of energy may, in some instances, be expensive, and thus miners may charge high gas prices to transactors to cover such costs. As mining and the general prevalence of cryptocurrencies increases, it may be advantageous to identify optimal (e.g., lowest cost) energy sources, so as to reduce gas prices. It may be difficult, however, to identify optimal alternatives, in light of the constant fluctuation of energy availability and request parameters. Accordingly, it may be advantageous to train, generate, and/or otherwise host a model to identify such optimal solutions, while balancing the limitations of computing resources such as available memory, processing power, and/or other resources, and the limitations of event processing, such as time/computational delays and energy cost.

SUMMARY

Aspects of the disclosure provide effective, efficient, scalable, and convenient technical solutions that address and overcome the technical problems associated with optimized energy selection. In accordance with one or more embodiments of the disclosure, a computing platform comprising at least one processor, a communication interface, and memory storing computer-readable instructions may receive a first cryptocurrency request indicating a gas price and key performance indicators (KPIs) of the first cryptocurrency request. The computing platform may input the gas price and the KPIs into a mining optimization model, which may cause the mining optimization model to output an energy mix for use in processing the first cryptocurrency request, where: 1) the energy mix indicates one or more energy sources, capable of providing an amount of energy needed to process the first cryptocurrency request and used to support operation of a data center computing platform configured to process cryptocurrency requests, and 2) a cost of the amount of energy from the energy mix is less than a cost of the amount of energy from other energy sources available to the data center computing platform. The computing platform may send, to the data center computing platform, one or more commands directing the data center computing platform to process the first cryptocurrency request using the energy mix, which may cause the data center computing platform to process the first cryptocurrency request using the energy mix.

In one or more instances, the computing platform may train the mining optimization model, which may include inputting, into the mining optimization model, one or more of: historical gas prices, historical KPIs, historical energy pricing information, weather information, climate information, energy preference information, and available energy sources. In one or more instances, the one or more energy sources may be different types of energy sources.

In one or more examples, the computing platform may update, by inputting user feedback and the energy mix into the mining optimization model, the mining optimization model. In one or more examples, the computing platform may identify that an accuracy level of the mining optimization model has reached a threshold accuracy level. Based on identifying that the accuracy level has reached the threshold accuracy level, the computing platform may halt updates to the mining optimization model until the accuracy level falls below the threshold accuracy level.

In one or more instances, the computing platform may receive, from a user device, an energy mix preference input, specifying the one or more energy sources to be included in the energy mix, which may cause a backend table of preferred energy sources for the corresponding user to be updated so as to include the particular energy source. In one or more instances, the KPIs include one or more of: time sensitivity, necessary processing power, and value.

In one or more examples, the first cryptocurrency request may be initiated on a distributed ledger corresponding to a cryptocurrency identified in the first cryptocurrency request. In one or more examples, processing the first cryptocurrency request may cause the first cryptocurrency request to be included as a permanent entry in the distributed ledger, which may include adding a new entry to the distributed ledger.

In one or more instances, the first cryptocurrency request may include a specified request priority level, and a transactor profile of a transactor corresponding to the first cryptocurrency request indicates different gas prices, acceptable to the transactor, based on different request priority levels. In one or more instances, the gas price may be less than a predetermined gas price corresponding to the specified request priority level. In one or more examples, the first cryptocurrency request may be initiated within a cryptocurrency wallet application corresponding to both a transactor of the first cryptocurrency request and one or more potential miners for the first cryptocurrency request.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2A-2E depict an illustrative event sequence for optimized energy usage in cryptocurrency mining in accordance with one or more example embodiments;

DETAILED DESCRIPTION

Figure 1A:
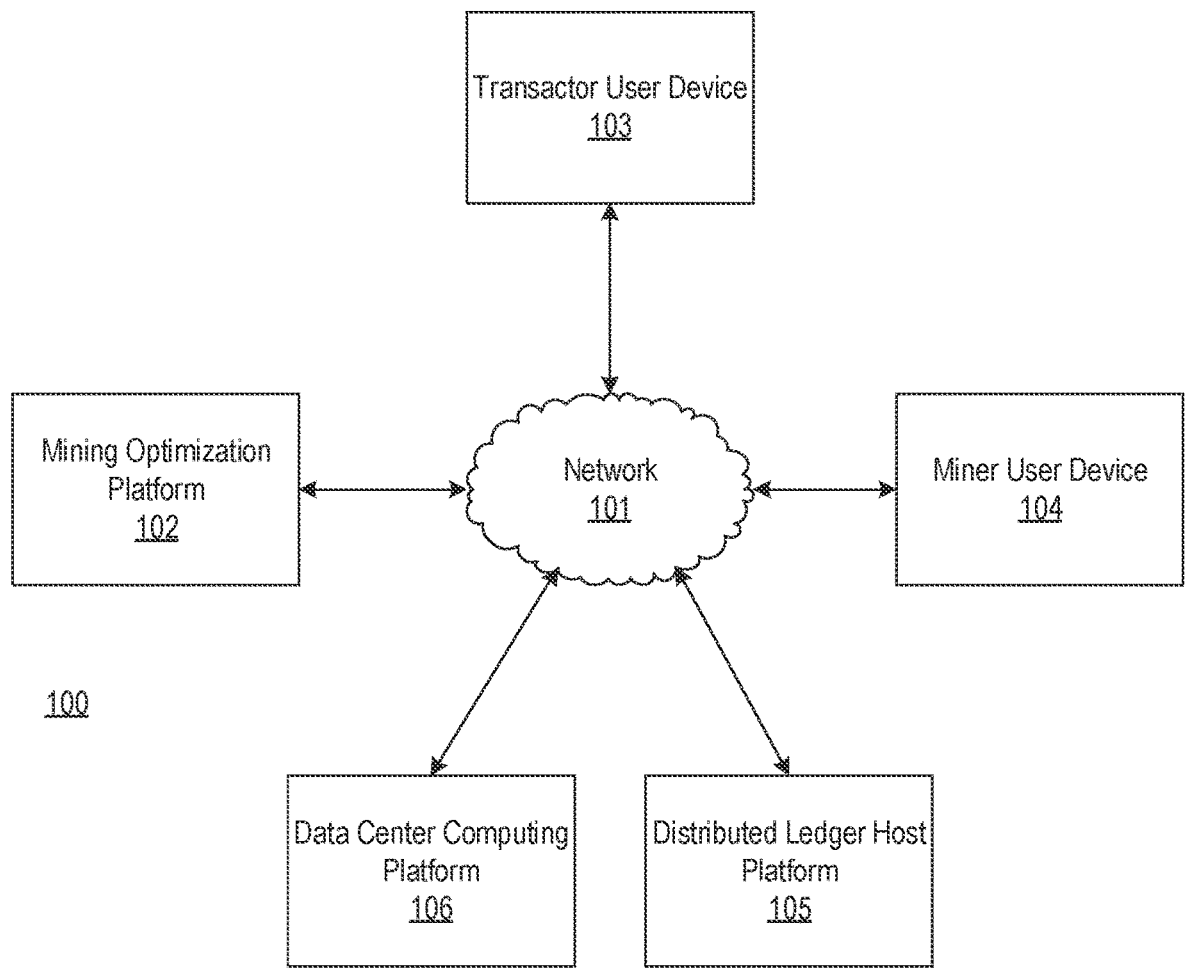
FIGS. 1A-1B depict an illustrative computing environment for optimized energy usage in cryptocurrency mining in in accordance with one or more example embodiments.

In the following description of various illustrative embodiments, reference is made to the accompanying drawings, which form a part hereof, and in which is shown, by way of illustration, various embodiments in which aspects of the disclosure may be practiced. In some instances, other embodiments may be utilized, and structural and functional modifications may be made, without departing from the scope of the present disclosure.

It is noted that various connections between elements are discussed in the following description. It is noted that these connections are general and, unless specified otherwise, may be direct or indirect, wired or wireless, and that the specification is not intended to be limiting in this respect.

As a brief introduction to the concepts described further herein, one or more aspects of the disclosure describe optimizing energy usage in cryptocurrency mining and/or other requests involving other digital assets. For example, producing digital assets from stablecoins, central bank digital currencies (CBDCs), non-fungible tokens (NFTs), and/or otherwise may involve a substantial amount of energy. Accordingly, described herein is a solution to optimize, prioritize, and incentivize users to pick green/more efficient energy sources whenever possible, while also providing the option to pick the type of energy sources and mix renewable and non-renewable energies.

For example, if mining is occurring in an individual's house, these concepts may be used to prioritize using local renewables and other energy supplies in proximity. Although such methods may default (e.g., automatically pull from) the calculated optimal mix of greener energies available at that specific time for the mining (or other specific job/work), an energy mix may also be selected/specified to a certain extent based on price, proximity, ethical, diverse sources, and/or otherwise, and may, in some instances, involve community/cooperative mining shares.

An individual energy user may also be incentivized for altruistic and/or innate reasons for feeling empowered just by seeing the transparency or, choosing to share/publicize this information (e.g., where their energy is being sourced/consumed, what percentage is coming from non-renewables versus renewable/sustainable energy sources, or the like). Another incentive may be providing rankings at the individual or group level by location, type of energy, percentage of renewables used, or the like. For example, similar to current electricity bills, the individual may be provided with how many energy units are being consumed versus their neighbor, and the corresponding price differences. They may also be able to see who and/or where the top user of energy is and other corresponding information (e.g., solar power is being used). To see and participate in such rankings, an individual may choose to opt in. In some instances, this may be scaled from an individual miner at home to also being used by corporations and governments, especially as digital assets are becoming more prevalent and diversifying.

The benefits of these methods may be illustrated in reference to cryptocurrency transactions involving a transactor that initiates the transaction and the miner who checks the validity of the initiated transaction and lets the transaction be included as a permanent entry into the blockchain. In these instances, the transactors pay the miners for their service, in terms of a gas price, which may be valued in terms of the native cryptocurrency and may, in some instances, be later converted into other currencies. Generally, a gas price in the context of cryptocurrency refers to a cost necessary to perform a transaction on a network.

The transactors may set an initial maximum value of the gas price that they are willing to pay for a particular transaction. However, the higher the gas price, the higher the likelihood that a miner will pick up the transaction and complete it in time.

The miner may use some actual hardware to complete the mining in data centers. However, one of the major costs of running data centers is the energy cost. A data center may run on some form of energy such as fossil fuels, renewable energy, or a mix.

Currently, transactions initiated by the transactors may be indistinguishable. The transactors may need to pay high gas prices for both high and low priority transactions. On the other hand, the miner may have to always pick transactions with only the highest gas prices to pay for the servers and corresponding energy bills.

Accordingly, the methods described herein may provide a means for the transactors to separate out transactions of high and low priority, and specify different gas prices for different types of priorities. Additionally or alternatively, miners may use the energy optimizer to optimize cost across different gas prices. This may allow them to take different jobs of different priorities using different gas prices.

This may be advantageous for both parties. For instance, the transactors may now use the blockchain for more types of transactions while the miners may increase their revenue using the long tail (e.g., when referring to a long tail model) at the end of a spectrum by processing cryptocurrency requests with the most cost effective energy mix.

Figure 1B:
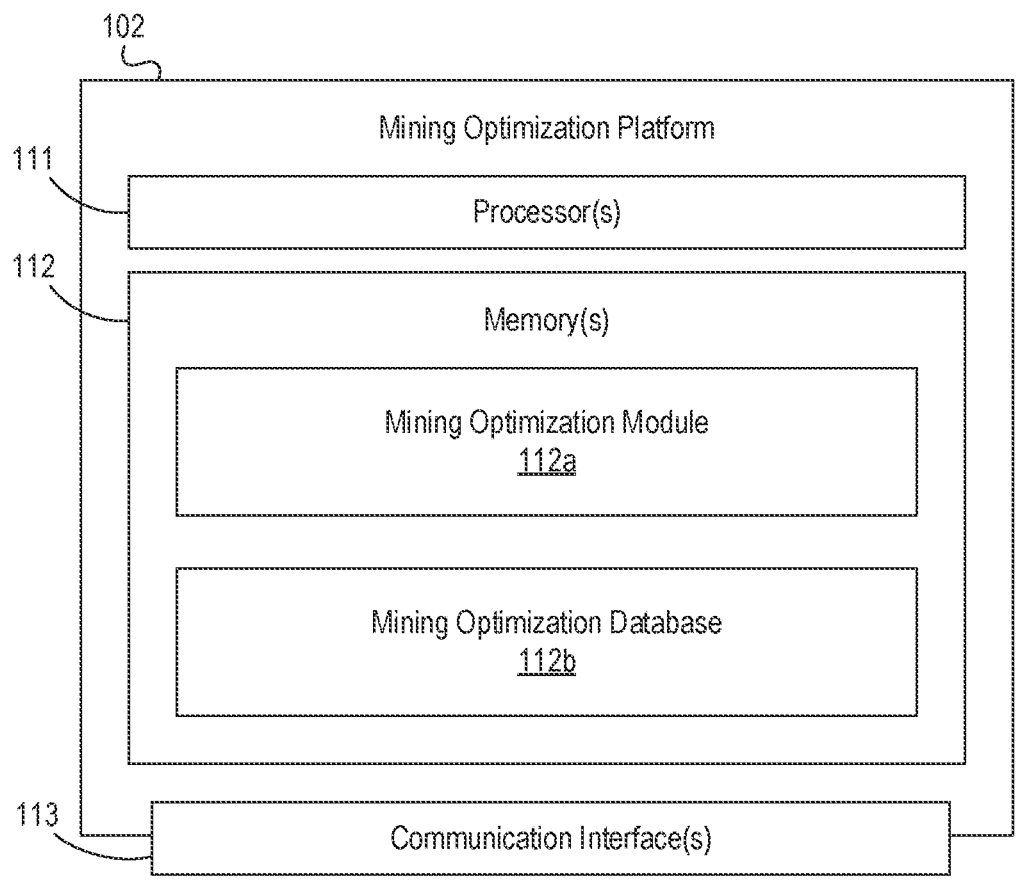

FIGS. 1A-1B depict an illustrative computing environment for optimized energy usage in cryptocurrency mining in accordance with one or more example embodiments. Referring to FIG. 1A, computing environment 100 may include one or more computer systems. For example, computing environment 100 may include a mining optimization platform 102, transactor user device 103, miner user device 104, distributed ledger host platform 106, and data center computing platform 105.

As described further below, mining optimization platform 102 may be a computer system that includes one or more computing devices (e.g., servers, server blades, or the like) and/or other computer components (e.g., processors, memories, communication interfaces) that may be used to train, host, and/or otherwise refine a mining optimization model, which may, e.g., be trained to identify an optimal mix of energy sources for use in performing cryptocurrency mining (e.g., in terms of minimizing cost while mining cryptocurrency within any specified time limits of a request). In some instances, the mining optimization model may similarly be trained to match transactors/cryptocurrency requests with miners based on pricing information, key performance indicators (KPIs), and/or other instances. In some instances, the mining optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing models, and/or other models.

Transactor user device 103 may be a mobile device, tablet, smartphone, desktop computer, laptop computer, and/or other device that may be used by an individual (e.g., a client of a financial institution, investor, and/or other individual) to input a cryptocurrency request (e.g., requests to buy, sell, trade, and/or otherwise transact with cryptocurrency). In some instances, the transactor user device 103 may be configured to provide one or more user interfaces (e.g., cryptocurrency request interfaces, miner selection interfaces, or the like).

Miner user device 104 may be a mobile device, tablet, smartphone, desktop computer, laptop computer, and/or other device that may be used by an individual (e.g., a cryptocurrency miner) to mine and/or otherwise facilitate processing of cryptocurrency requests. In some instances, the miner user device 104 may be configured to provide one or more user interfaces (e.g., energy savings/reward interfaces, energy source selection interfaces, or the like).

Data center computing platform 105 may include one or more computing devices (e.g., servers, server blades, and/or other devices) and/or other computer components (e.g., processors, memories, communication interfaces). In some instances, data center computing platform 105 may be configured to execute cryptocurrency mining actions. In these instances, such cryptocurrency mining actions may be supported using energy received from one or more energy sources (e.g., green energy sources, fossil fuel sources, and/or other energy sources). As described herein, green energy sources (which may, as described herein, include other clean/renewable energy sources) may include energy received from sources considered renewable and/or clean (e.g., wind, solar, hydro, and/or other energy sources), whereas non-green energy sources may include sources from fossil fuel (e.g., oil, coal, natural gas, and/or other energy sources).

Distributed ledger host platform 106 may include one or more computing devices (e.g., servers, server blades, and/or other devices) and/or other computer components (e.g., processors, memories, communication interfaces). In some instances, distributed ledger host platform 106 may be configured to establish, host, and/or otherwise modify a distributed ledger corresponding to a particular cryptocurrency. For example, the distributed ledger host platform 106 may be configured to add new entries and/or otherwise write/record information to the distributed ledger based on cryptocurrency requests and the mining/validation thereof.

Computing environment 100 also may include one or more networks, which may interconnect mining optimization platform 102, transactor user device 103, miner user device 104, data center computing platform 105, distributed ledger host platform 106, or the like. For example, computing environment 100 may include a network 101 (which may interconnect, e.g., mining optimization platform 102, transactor user device 103, miner user device 104, data center computing platform 105, distributed ledger host platform 106, or the like).

In one or more arrangements, mining optimization platform 102, transactor user device 103, miner user device 104, distributed ledger host platform 106, and/or data center computing platform 105 may be any type of computing device capable of sending and/or receiving requests and processing the requests accordingly. For example, mining optimization platform 102, transactor user device 103, miner user device 104, distributed ledger host platform 106, data center computing platform 105, and/or the other systems included in computing environment 100 may, in some instances, be and/or include server computers, desktop computers, laptop computers, tablet computers, smart phones, or the like that may include one or more processors, memories, communication interfaces, storage devices, and/or other components. As noted above, and as illustrated in greater detail below, any and/or all of mining optimization platform 102, transactor user device 103, miner user device 104, distributed ledger host platform 106, and/or data center computing platform 105 may, in some instances, be special-purpose computing devices configured to perform specific functions.

Referring to FIG. 1B, mining optimization platform 102 may include one or more processors 111, memory 112, and communication interface 113. A data bus may interconnect processor 111, memory 112, and communication interface 113. Communication interface 113 may be a network interface configured to support communication between mining optimization platform 102 and one or more networks (e.g., network 101, or the like). Memory 112 may include one or more program modules having instructions that when executed by processor 111 cause mining optimization platform 102 to perform one or more functions described herein and/or one or more databases that may store and/or otherwise maintain information which may be used by such program modules and/or processor 111. In some instances, the one or more program modules and/or databases may be stored by and/or maintained in different memory units of mining optimization platform 102 and/or by different computing devices that may form and/or otherwise make up mining optimization platform 102. For example, memory 112 may have, host, store, and/or include mining optimization module 112a and a mining optimization database 112b.

Mining optimization module 112a may have instructions that direct and/or cause mining optimization platform 102 to execute advanced techniques to identify optimal resources for energy optimization in cryptocurrency mining. In some instances, the mining optimization module 112a may include a mining optimization model. Mining optimization database 112b may store information used by mining optimization module 112a and/or mining optimization platform 102 to identify optimal resources for energy optimization, cryptocurrency mining, and/or in performing other functions.

Figure 2A:
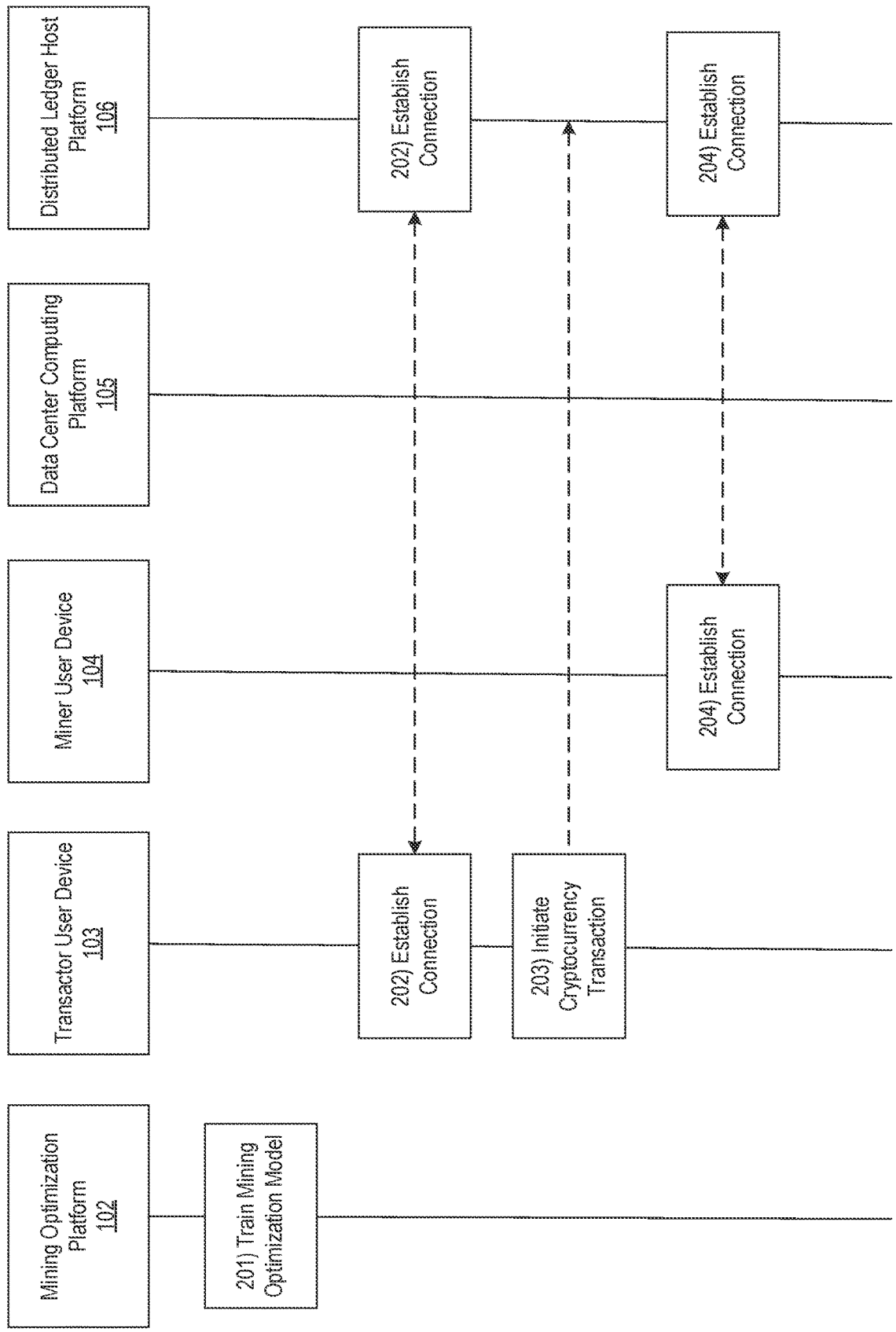

FIGS. 2A-2E depict an illustrative event sequence for optimized energy usage in cryptocurrency mining in accordance with one or more example embodiments. Referring to FIG. 2A, at step 201, the mining optimization platform 102 may train a mining optimization model. For example, the energy optimization platform 102 may train a model configured to input parameters of cryptocurrency requests (e.g., a mining request, or the like), and identify, based on the parameters, an optimal energy mix for a data center (e.g., data center computing platform 105 or other data centers) to use in processing the cryptocurrency request. To do so, the mining optimization model may input a number of historical cryptocurrency requests, the corresponding parameters (e.g., necessary processing power, time limitations, value, and/or other information), priority levels, historical energy pricing information, weather information, geographic information, climate information, energy sources available at various data centers, user preference information (e.g., a preference for particular green energy sources, or the like), and/or other information.

In doing so, the mining optimization model may be trained to identify an energy mix that may be most optimal in supplying the necessary energy to a data center needed to process various cryptocurrency requests. In these instances, optimal may refer to a least expensive energy solution for providing the necessary energy. Similarly, a dynamic link between the mining optimization platform 102 and a plurality of energy sources and/or the data center computing platform 105 may be established so as to enable the mining optimization platform 102 to dynamically monitor processing conditions (e.g., processing power, capacity, memory, processing load, and/or other information) at the data center computing platform 105 and/or energy availability/pricing information at the various energy sources. In doing so, the mining optimization platform 102 may train the mining optimization model to identify a least expensive energy solution for use in processing cryptocurrency requests at various data centers.

In some instances, the mining optimization model may be trained to provide solutions both for cryptocurrency miners (e.g., in terms of a most cost effective energy solution for mining) and transactors (e.g., in terms of identifying a lowest gas price for a cryptocurrency solution). For example, a most cost effective energy mix may be identified for a plurality of miners to mine a particular cryptocurrency request. In these instances, the mining optimization platform 102 may be trained to identify gas prices, for each miner, based on the corresponding energy mixes. Then, using the gas prices, the mining optimization model may identify a most optimal (e.g., in terms of lowest cost, KPIs, energy source information (e.g., percentage of renewables, or the like)) miner to mine the given request. For example, historical gas price information, miner identities, KPIs, energy source information, user preference information, and/or other information may be fed into the mining optimization model so as to optimize selection of a most cost effective miner for a particular transactor in view of a given cryptocurrency request.

In some instances, the mining optimization model may be or include one or more supervised learning models (e.g., decision trees, bagging, boosting, random forest, neural networks, linear regression, artificial neural networks, logical regression, support vector machines, and/or other models), unsupervised learning models (e.g., clustering, anomaly detection, artificial neural networks, and/or other models), knowledge graphs, simulated annealing algorithms, hybrid quantum computing solutions, and/or other models.

At step 202, the transactor user device 103 may establish a connection with the distributed ledger host platform 106. For example, the transactor user device 103 may establish a first wireless data connection with the distributed ledger host platform 106 to link the transactor user device 103 with the distributed ledger host platform 106 (e.g., in preparation for initiating cryptocurrency requests). In some instances, the transactor user device 103 may identify whether or not a connection is already established with the distributed ledger host platform 106. If a connection is already established with the distributed ledger host platform 106, the transactor user device 103 might not re-establish the connection. If a connection is not yet established with the distributed ledger host platform 106, the transactor user device 103 may establish the first wireless data connection as described herein.

At step 203, the transactor user device 103 may initiate a cryptocurrency request (e.g., a request to buy, sell, exchange, and/or otherwise execute a transaction involving cryptocurrency). In some instances, in initiating the cryptocurrency request, the transactor user device 103 may include a request priority level for the cryptocurrency request, which may, e.g., be indicative of a time sensitivity of the cryptocurrency request. In some instances, the transactor user device 103 may have a pre-established transactor profile, which may include information such as gas price ranges, acceptable to the transactor, for various priority levels (e.g., willing to pay between A and B amounts for a processing to occur within predetermined time period C, between D and E amounts for processing to occur within predetermined time period F, or the like—where A/B are more than D/E, and C is shorter than F).

Figure 6:
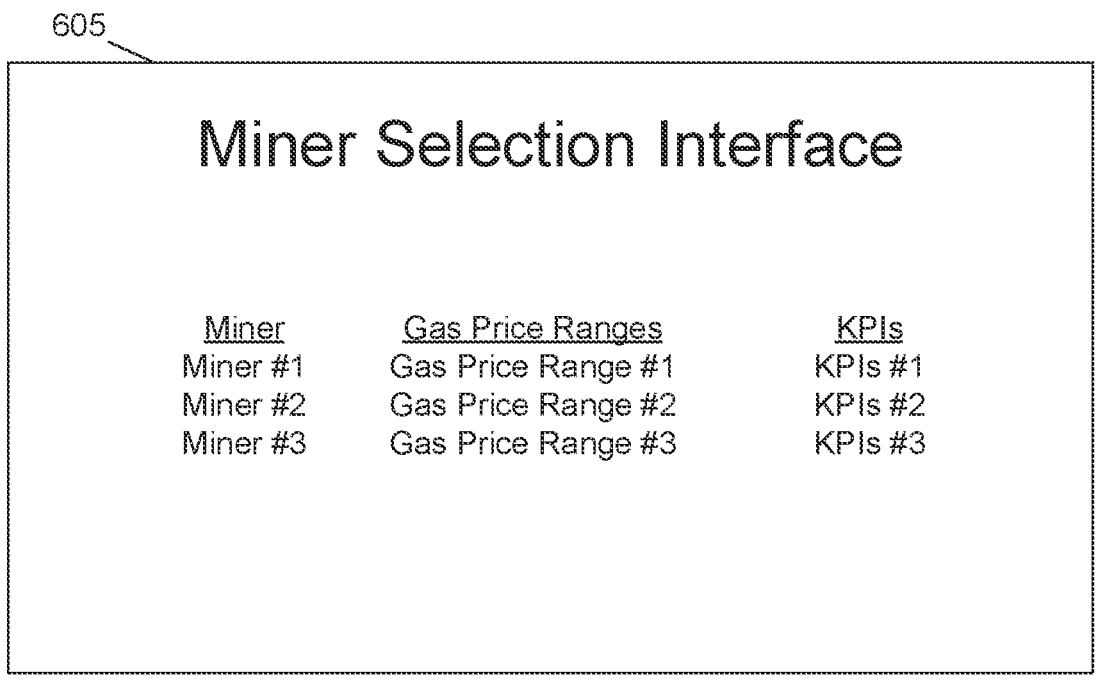

In some instances, the cryptocurrency request may be initiated within a cryptocurrency wallet application, which may, e.g., be installed at both the transactor user device 103 and the miner user device 104. In these instances, the cryptocurrency wallet application may maintain these transactor profiles defining gas price ranges and priority levels for transactors, as well as gas price ranges, priority levels, and/or other KPIs for miners. In some instances, the cryptocurrency wallet application may be configured to automatically match a miner (e.g., a user associated with miner user device 104) with the cryptocurrency request based on these parameters. Additionally or alternatively, the transactor user device 103 may display a graphical user interface similar to graphical user interface 605, which is shown in FIG. 6, that includes this information. In these instances, a transactor may select a miner via the interface. In instances where a specific miner is identified/selected for the cryptocurrency transaction, information of the cryptocurrency transaction may be sent to the miner user device 104 (e.g., via the cryptocurrency wallet application, or otherwise), and the miner user device 104 might not need to identify the cryptocurrency transaction via monitoring the distributed ledger as described below at step 205.

In some instances, the transactor user device 103 may initiate the cryptocurrency request while the first wireless data connection is established. In some instances, based on or in response to detecting initiation of the cryptocurrency request, the distributed ledger host platform 106 may add a data entry to a distributed ledger corresponding to a cryptocurrency of the cryptocurrency request, which may, e.g., indicate parameters of the request.

At step 204, the miner user device 104 may establish a connection with the distributed ledger host platform 106. For example, the miner user device 104 may establish a second wireless data connection with the distributed ledger host platform 106 to link the miner user device 104 with the distributed ledger host platform 106 (e.g., to enable the miner user device to detect cryptocurrency requests). In some instances, the miner user device 104 may identify whether a connection is already established with the distributed ledger host platform 106. If a connection is already established with the distributed ledger host platform 106, the miner user device 104 might not re-establish the connection. Otherwise, if a connection is not yet established with the distributed ledger host platform 106, the miner user device 104 may establish the second wireless data connection as described herein.

Figure 2B:
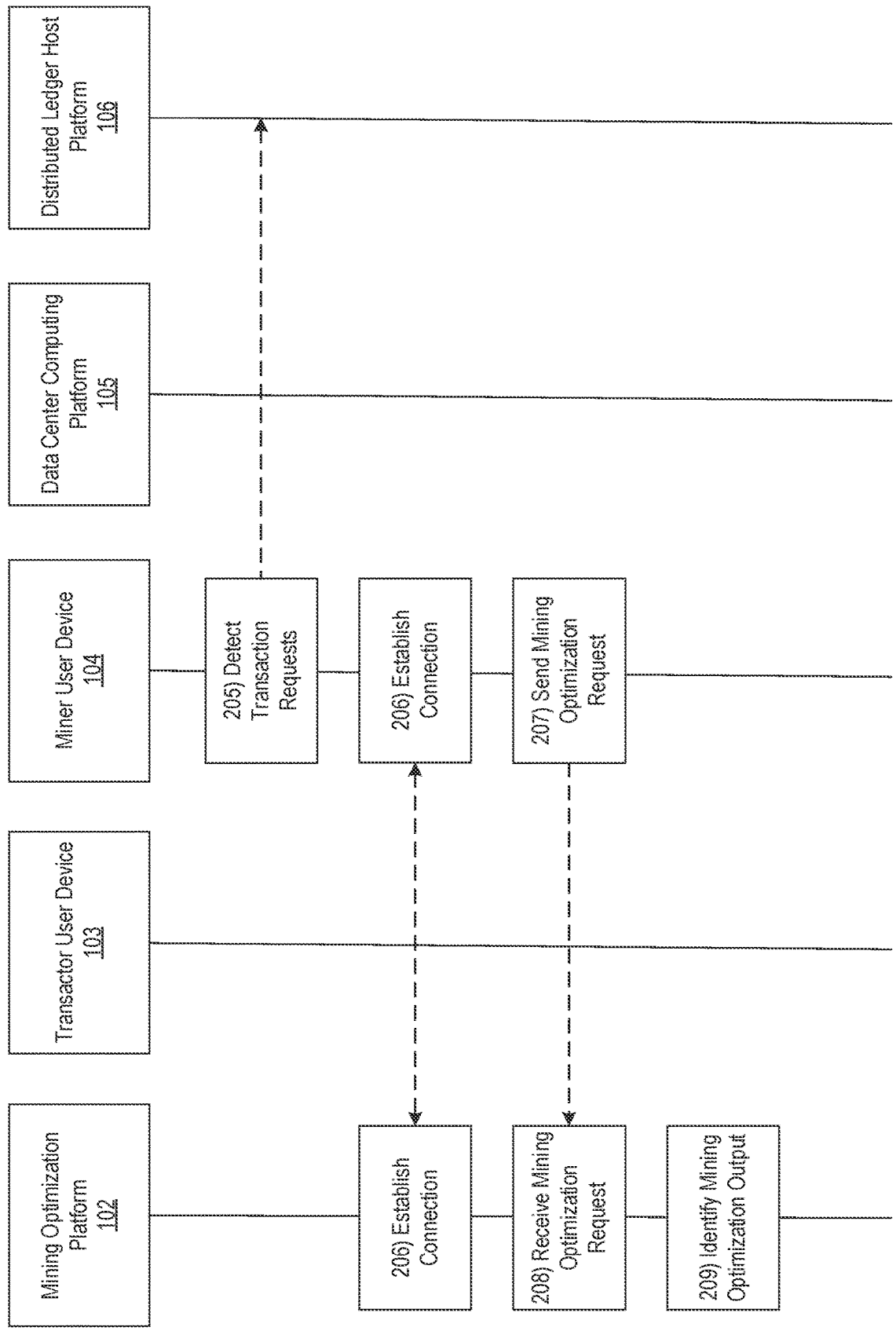

Referring to FIG. 2B, at step 205, the miner user device 104 may monitor the distributed ledger host platform 106 to detect any cryptocurrency requests. In some instances, the miner user device 104 may monitor the distributed ledger host platform 106 while the second wireless data connection is established. For example, the miner user device 104 may detect the cryptocurrency request initiated by the transactor user device 103 at step 203.

At step 206, the miner user device 104 may establish a connection with the mining optimization platform 102. For example, the miner user device 104 may establish a third wireless data connection with the mining optimization platform 102 to link the miner user device 104 to the mining optimization platform 102 (e.g., in preparation for sending mining optimization requests). In some instances, the miner user device 104 may identify whether a connection is already established with the mining optimization platform 102. If a connection is already established with the mining optimization platform 102, the miner user device 104 might not re-establish the connection. Otherwise, if a connection is not yet established with the mining optimization platform 102, the miner user device 104 may establish the third wireless data connection as described herein.

At step 207, the miner user device 104 may send a mining optimization request to the mining optimization platform 102. For example, the miner user device 104 may send a request for an optimal energy combination for use in mining cryptocurrency corresponding to the cryptocurrency request (e.g., a mix of energy sources that may provide the lowest cost option mining the cryptocurrency, in view of any time constraints, KPIs, and/or other information of the cryptocurrency request).

In some instances, the miner user device 104 may send, along with the mining optimization request, KPIs, gas price range information, and/or other parameters of the mining optimization request. For example, the miner user device 104 may send any value information (e.g., cryptocurrency amount, and/or other value information), time constraints (e.g., processing deadline, or other time information), processing preference information (e.g., whether to use only green energy for processing, or other specified energy mix information), an amount of processing power needed to mine the cryptocurrency, and/or other information.

In instances where processing preference information is sent, this may, in some instances, be based on a user preference profile (e.g., for a miner of the miner user device 104), which may, e.g., be configured and/or modified based on user input received via an interface of the miner user device 104. For example, a miner may configure energy preferences by selecting, deselecting, and/or otherwise modifying a list of energy types (e.g., solar, wind, hydro, geo-thermal, fossil fuel, nuclear, and/or other types) to be used in mining cryptocurrency for the miner. For example, a table of acceptable energy types may be stored and associated with each miner's user preference profile. Corresponding miners may provide input that causes these acceptable energy types to be removed or added from the table, which may, e.g., cause the table/user preference profile to be modified. In some instances, the miner user device 104 may send the mining optimization request while the third wireless data connection is established.

At step 208, the mining optimization platform 102 may receive the mining optimization request sent at step 207. In some instances, the mining optimization platform 102 may cause a table of acceptable energy types/miner preference profile to be updated based on any user preference information included in the mining optimization request. In some instances, the mining optimization platform 102 may receive the mining optimization request via the communication interface 113 and while the third wireless data connection is established.

At step 209, the mining optimization platform 102 may input the information of the mining optimization request into the mining optimization model. In doing so, the mining optimization platform 102 may identify an optimal mix of energy sources for use in mining the cryptocurrency for the cryptocurrency request. For example, the mining optimization model may identify an amount of energy needed to mine the cryptocurrency, and may identify various mixes of energy sources, supplying energy to the data center computing platform 105, configured to provide the corresponding energy. In some instances, the mining optimization model may rank these energy sources according to energy cost. In some instances, in doing so, the mining optimization model may take into account whether a given energy source produces storable energy, or whether the energy produced may be available only temporarily for use. In these instances, such factors may be considered by the mining optimization model so as to reduce wasted energy by ensuring the timely use of any energy for which storage is not available. In some instances, the mining optimization model may further rank these energy sources according to any user preferences. For example, if the miner and/or transactor specified a preference for renewable/green energy sources, any green energy sources may be ranked, for example, higher than fossil fuel or other sources. Otherwise, if the miner and/or transactor specified a preference for a lowest cost solution, the energy sources may be ranked based on cost. Once ranked, the mining optimization model may output the highest ranked mix of energy sources. In some instances, the mix of energy sources may include a single energy source, or multiple energy sources.

In some instances, data center computing platform 105 may be configured with a hierarchy of energy sources to be used if available. For example, the data center computing platform 105 may be located in a region where solar power is the least expensive energy, fossil fuel is second, and wind power is third. In these instances, the mining optimization model may identify that all available solar power should be used in mining the cryptocurrency until depleted, at which point, fossil fuel should be used, and so on. In some instances, the mining optimization platform 102 may dynamically adjust this hierarchy on a regular basis (e.g., hourly, daily, weekly, etc.) based on weather patterns, environmental factors, and/or other information. For example, the first edge computing system 104 may adjust for solar power to be used only during daylight hours, or the like.

For example, availability of solar power may fluctuate based on time of day in a particular region, but may always be available in some region (e.g., as movement of the sun is followed). Accordingly, in these instances, the mining optimization platform 102 may consider such patterns so as to select energy sources accordingly. Similar techniques may be used to identify energy sources for different data centers moving from East to West and North to South across the globe, which may, e.g., be configured to provide the largest amount of a particular energy source (e.g., not limited only to solar, but to other energy sources as well). In some instances, by tracing environmental patterns in this way, the mining optimization platform 102 may help to minimize the cost of energy used to process the requested event.

In some instances, the total energy cost corresponding to the identified energy mix may correspond to a gas price that is within a price range (e.g., less than a maximum) specified by the transactor based on a priority level of the cryptocurrency request.

In some instances, a similar process may be used to identify the data center computing platform 105 itself. For example, the mining optimization platform 102 may dynamically monitor processing capacity, energy sources, energy pricing, downtime, outages, and/or other information corresponding to a plurality of data centers, and may identify not only the energy mix for the data center computing platform 105, but may select the data center computing platform 105 itself for processing as well.

Figure 2C:
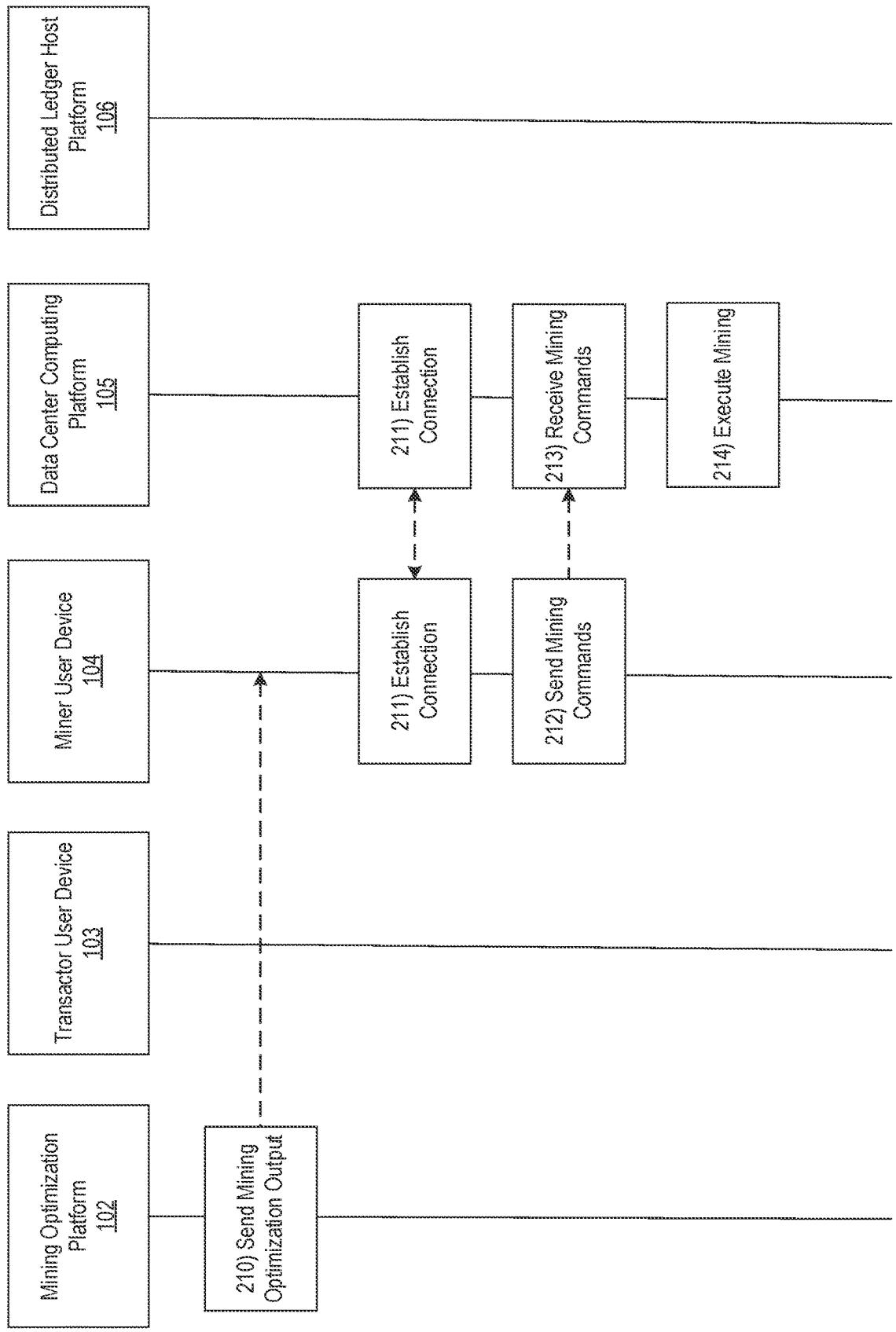

Referring to FIG. 2C, at step 210, the mining optimization platform 102 may send a mining optimization output, which may, e.g., include the energy mix identified at step 209. In some instances, the mining optimization platform 102 may send the mining optimization output to the miner user device 104. Additionally or alternatively, the mining optimization platform 102 may send the mining optimization output directly to the data center computing platform 105. In these instances, the mining optimization platform 102 may send one or more commands directing the data center computing platform 105 to mine the cryptocurrency using energy from energy sources included in the energy mix (which may, in some instances, include sending commands to the energy sources themselves, one or more energy transmission systems, and/or other systems to cause the corresponding energy transfer).

At step 211, the miner user device 104 may establish a connection with the data center computing platform 105. For example, the miner user device 104 may establish a fourth wireless data connection with the data center computing platform 105 to link the miner user device 104 to the data center computing platform 105 (e.g., in preparation for sending one or more commands directing the data center computing platform 105 to mine the cryptocurrency using the identified energy mix as described above at step 210 (e.g., in the event that the mining optimization output was sent to the miner user device 104 rather than the data center computing platform 105)). In some instances, the miner user device 104 may identify whether a connection is already established with the data center computing platform 105. If a connection is already established with the data center computing platform 105, the miner user device 104 might not re-establish the connection. If a connection is not yet established with the data center computing platform 105, the miner user device 104 may establish the fourth wireless data connection as described herein.

At step 212, the miner user device 104 may send one or more commands directing the data center computing platform 105 to mine the cryptocurrency using the energy mix (e.g., as described above at step 210). For example, the miner user device 104 may send the one or more commands directing the data center computing platform 105 to mine the cryptocurrency while the fourth wireless data connection is established.

At step 213, the data center computing platform 105 may receive the one or more commands directing the data center computing platform 105 to mine the cryptocurrency, sent at step 212. For example, the data center computing platform 105 may receive the one or more commands directing the data center computing platform 105 to mine the cryptocurrency while the fourth wireless data connection is established. In some instances, where the mining commands are sent directly from the mining optimization platform 102 to the data center computing platform 105, steps 211-213 might not be performed.

At step 214, the data center computing platform 105 may mine the cryptocurrency of and/or otherwise process the cryptocurrency request. For example, the data center computing platform 105 may execute one or more processes to create, transfer, obtain, and/or otherwise transact with the cryptocurrency. In doing so, the data center computing platform 105 may use energy sources and corresponding energy amounts (e.g., a first percentage of energy from a first source and a second percentage from a second source, etc.) as specified in the energy mix. In some instances, the data center computing platform 105 may communicate with energy distribution systems corresponding to the mix of energy sources, so as to direct those energy sources to provide the necessary energy (which may, e.g., cause these energy sources to provide the energy). Additionally or alternatively, the data center computing platform 105 may receive energy from a variety of energy sources, not specifically limited to the mix of energy sources, but then may use exclusively energy from the mix of energy sources to process the cryptocurrency request.

Figure 2D:
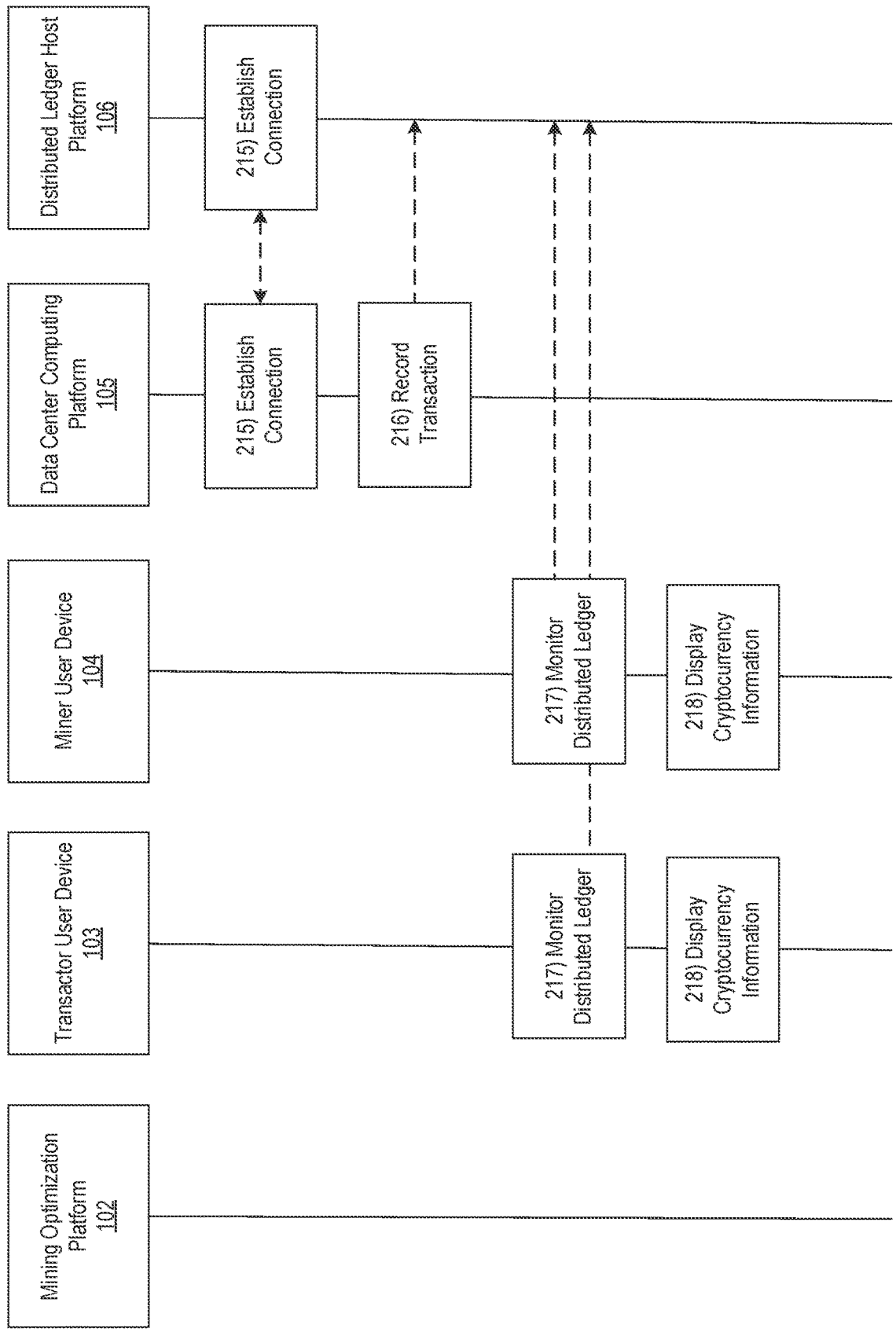

Referring to FIG. 2D, at step 215, the data center computing platform 105 may establish a connection with the distributed ledger host platform 106. For example, the data center computing platform 105 may establish a fifth wireless data connection with the distributed ledger host platform 106 to link the data center computing platform 105 with the distributed ledger host platform 106 (e.g., in preparation for recording processing of the cryptocurrency transaction to the distributed ledger). In some instances, the data center computing platform 105 may identify whether or not a connection is already established with the distributed ledger host platform 106. If a connection is already established with the distributed ledger host platform 106, the data center computing platform 105 might not re-establish the connection. Otherwise, if a connection is not yet established with the distributed ledger host platform 106, the data center computing platform 105 may establish the fifth wireless data connection as described herein.

At step 216, the data center computing platform 105 may record the processed cryptocurrency transaction to the distributed ledger at the distributed ledger host platform 106. For example, the data center computing platform 105 may cause the distributed ledger host platform 106 to add and/or otherwise modify an entry of the distributed ledger corresponding to the cryptocurrency so as to reflect the cryptocurrency transaction. In some instances, recording the processed cryptocurrency transaction may cause the distributed ledger host platform 106 to include a permanent entry, representative of the cryptocurrency transaction, to the distributed ledger (which may, in some instances, include adding a new entry to the distributed ledger). In some instances, the data center computing platform 105 may perform the recordation while the fifth wireless data connection is established.

Figure 4:
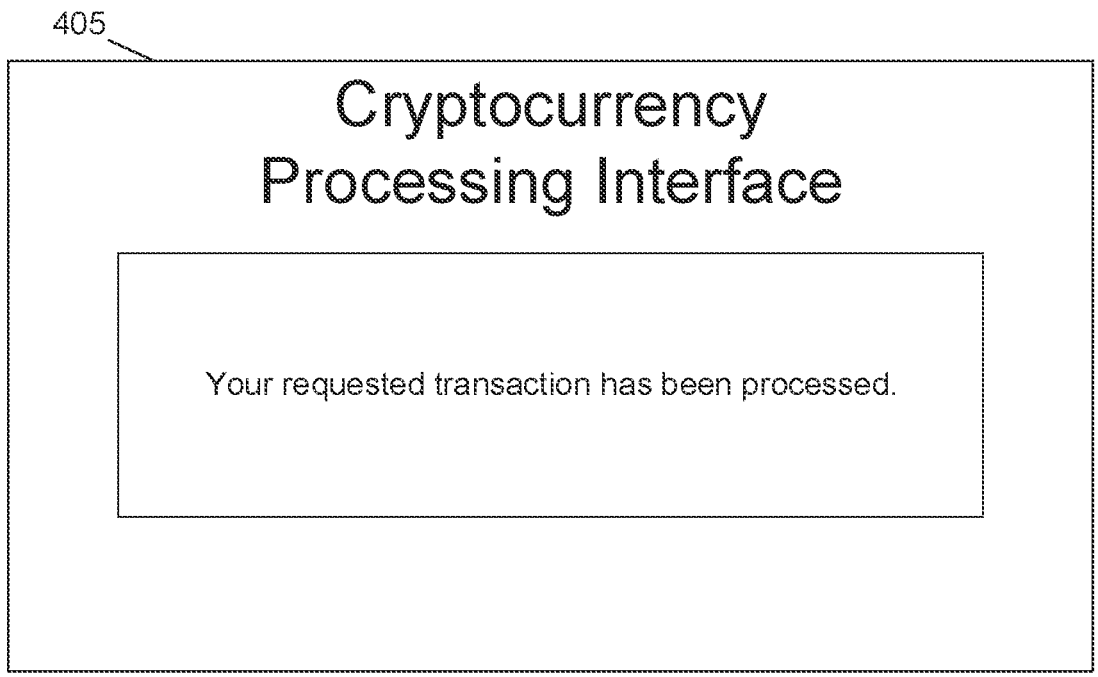
FIGS. 4-6 depict illustrative graphical user interfaces for optimized energy usage in cryptocurrency mining in accordance with one or more example embodiments.
Figure 5:
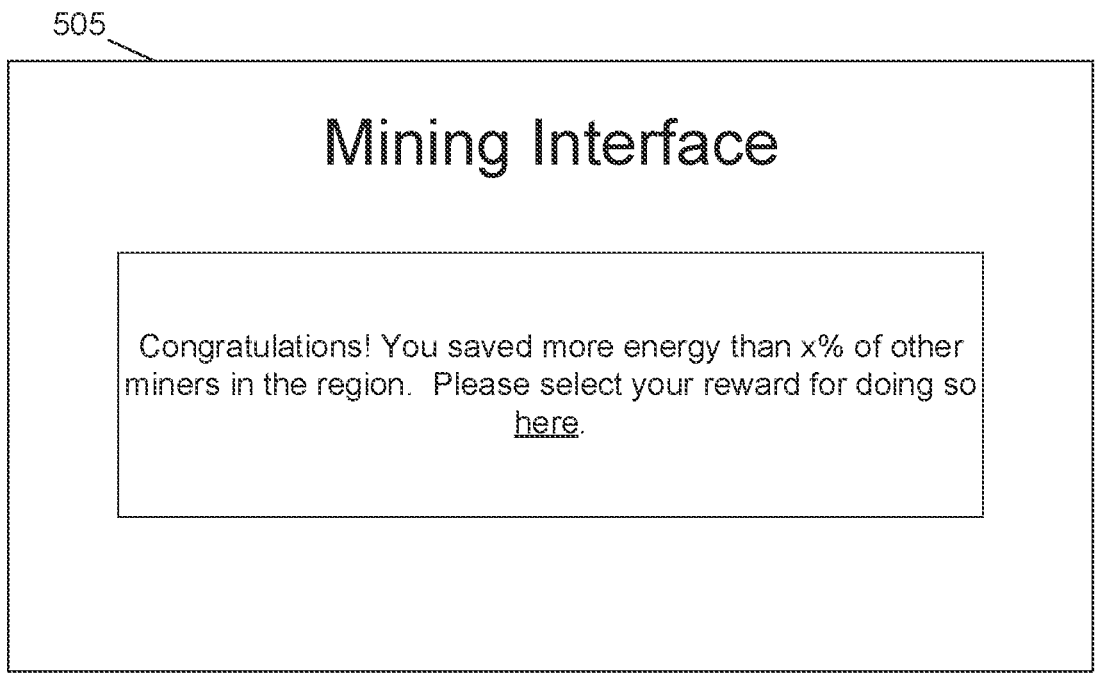

At step 217, the transactor user device 103 and/or miner user device 104 may monitor the distributed ledger host platform 106 so as to detect processing of the cryptocurrency request. At step 218, based on or in response to detecting that the cryptocurrency request was processed, the transactor user device 103 and/or miner user device 104 may display cryptocurrency information, indicative of the processed request. For example, the transactor user device 103 may display a graphical user interface similar to graphical user interface 405, which is shown in FIG. 4, and which may include confirmation that the request was processed, a gas price, an energy mix used in processing, and/or other information. As another example, the miner user device 104 may display a graphical user interface similar to graphical user interface 505, which is shown in FIG. 5, and which may include gas price information, energy information, energy savings reward information, and/or other information.

In some instances, these interfaces for the transactors and/or miners may include user specific statistics (e.g., how much energy or cost was saved in comparison to other individuals in the region, a ranking of how earth friendly the individual is based on the use of green energy in comparison to fossil fuels, and/or other information). In some instances, this may be incorporated into a social network or other resource for the miners. In some instances, based on the amount of energy savings, miners may be presented with a reward such as carbon credits, non-fungible tokens, discounts, and/or other rewards (which may, in some instances be presented as options to an individual). Additionally or alternatively these interfaces may display where energy is being sourced/consumed, what percentage of energy is coming from non-renewables versus renewable/sustainable energy sources, rankings at individual or group levels by location, type of energy, percent of renewables used, or the like. In some instances, the transactors and/or miners may opt in to provide/receive information from this service.

Referring to FIG. 2E, at step 219, mining optimization platform 102 may update the mining optimization model based on model outputs, user feedback, the parameters, the energy mix, the gas prices, the KPIs, and/or other information. For example, in some instances, user feedback information (e.g., indicating a level of satisfaction with gas prices, the mix of energy sources, and/or other information)

may be received. In these instances, this information may be fed back into the model through a continuous and dynamic feedback loop, so as to refine the model and continually improve model accuracy.

In some instances, the mining optimization platform 102 may maintain an accuracy threshold corresponding to the mining optimization model, and may halt refinement of the mining optimization model where a level of accuracy meets or exceeds the accuracy threshold, so as to conserve bandwidth, processing power, and/or other computing resources. In some instances, these levels of accuracy may be based on the user feedback (e.g., if feedback is received indicating that the user is satisfied, a 1 may be assigned to the corresponding event processing request as feedback, whereas a 0 may be assigned where negative feedback is received). In these instances, a sum of the values may be identified, and then divided by the total number of values. This may provide a decimal value (e.g., the level of accuracy), which may be compared to the accuracy threshold. In some instances, only values for a predetermined time window may be considered (e.g., over the past day, week, month, etc.).

By optimizing selection of energy sources for event processing in this way, energy costs may be minimized on a per request basis without sacrificing processing time. Similarly, in some instances, green energy sources may be substituted for fossil fuel or other energy sources where possible without increasing processing delays or cost.

Although the above described event sequence is described primarily with regard to cryptocurrency, the methods may also be applied to other digital assets without departing from the scope of the disclosure.

Figure 3:
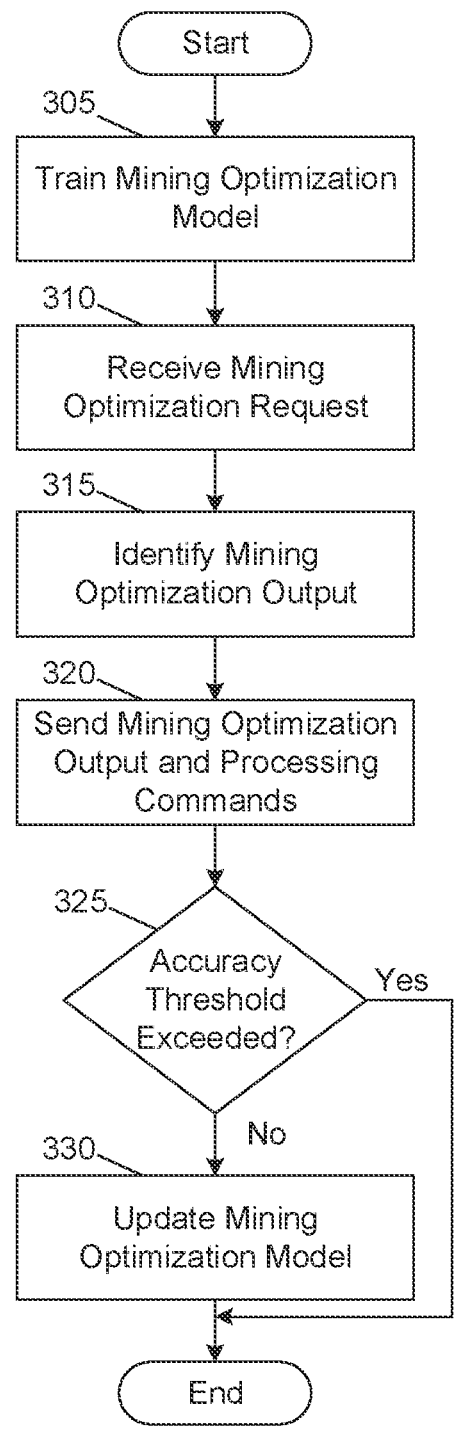
FIG. 3 depicts an illustrative method for optimized energy usage in cryptocurrency mining in accordance with one or more example embodiments.

FIG. 3 depicts an illustrative method for optimized energy usage in cryptocurrency mining in accordance with one or more example embodiments. Referring to FIG. 3, at step 305, a computing platform having at least one processor, a communication interface, and memory may training a mining optimization model. At step 310, the computing platform may receive a mining optimization request. At step 315, the computing platform may identify a mining optimization output, indicating an energy mix for use in processing a cryptocurrency request corresponding to the mining optimization request. At step 320, the computing platform may send the mining optimization output and one or more commands directing a data center computing platform to process the cryptocurrency request using the identified energy mix. At step 325, the comuting platform may identify whether an accuracy threshold of the mining optimization model is exceeded. If so, the method may end. Otherwise, if the accuracy threshold is not exceeded, the computing platform may proceed to step 330. At step 330, the computing platform may update the mining optimization model.

One or more aspects of the disclosure may be embodied in computer-usable data or computer-executable instructions, such as in one or more program modules, executed by one or more computers or other devices to perform the operations described herein. Generally, program modules include routines, programs, objects, components, data structures, and the like that perform particular tasks or implement particular abstract data types when executed by one or more processors in a computer or other data processing device. The computer-executable instructions may be stored as computer-readable instructions on a computer-readable medium such as a hard disk, optical disk, removable storage media, solid-state memory, RAM, and the like. The functionality of the program modules may be combined or distributed as desired in various embodiments. In addition, the functionality may be embodied in whole or in part in firmware or hardware equivalents, such as integrated circuits, application-specific integrated circuits (ASICs), field programmable gate arrays (FPGA), and the like. Particular data structures may be used to more effectively implement one or more aspects of the disclosure, and such data structures are contemplated to be within the scope of computer executable instructions and computer-usable data described herein.

Various aspects described herein may be embodied as a method, an apparatus, or as one or more computer-readable media storing computer-executable instructions. Accordingly, those aspects may take the form of an entirely hardware embodiment, an entirely software embodiment, an entirely firmware embodiment, or an embodiment combining software, hardware, and firmware aspects in any combination. In addition, various signals representing data or events as described herein may be transferred between a source and a destination in the form of light or electromagnetic waves traveling through signal-conducting media such as metal wires, optical fibers, or wireless transmission media (e.g., air or space). In general, the one or more computer-readable media may be and/or include one or more non-transitory computer-readable media.

As described herein, the various methods and acts may be operative across one or more computing servers and one or more networks. The functionality may be distributed in any manner, or may be located in a single computing device (e.g., a server, a client computer, and the like). For example, in alternative embodiments, one or more of the computing platforms discussed above may be combined into a single computing platform, and the various functions of each computing platform may be performed by the single computing platform. In such arrangements, any and/or all of the above-discussed communications between computing platforms may correspond to data being accessed, moved, modified, updated, and/or otherwise used by the single computing platform. Additionally or alternatively, one or more of the computing platforms discussed above may be implemented in one or more virtual machines that are provided by one or more physical computing devices. In such arrangements, the various functions of each computing platform may be performed by the one or more virtual machines, and any and/or all of the above-discussed communications between computing platforms may correspond to data being accessed, moved, modified, updated, and/or otherwise used by the one or more virtual machines.

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one or more of the steps depicted in the illustrative figures may be performed in other than the recited order, and one or more depicted steps may be optional in accordance with aspects of the disclosure.

What is claimed is:

1. A computing platform comprising:
   one or more processors;
   a communication interface communicatively coupled to the one or more processors; and
   memory storing computer-readable instructions that, when executed by the one or more processors, cause the computing platform to:
   receive a first cryptocurrency request indicating a gas price and key performance indicators (KPIs) of the first cryptocurrency request;

input the gas price and the KPIs into a mining optimization model, wherein inputting the gas price and the KPIs into the mining optimization model causes the mining optimization model to output an energy mix for use in processing the first cryptocurrency request, wherein:
  the energy mix indicates one or more energy sources, capable of providing an amount of energy needed to process the first cryptocurrency request and used to support operation of a data center computing platform configured to process cryptocurrency requests, wherein:
    the energy mix includes a hierarchy of the one or more energy sources, wherein energy produced by a highest ranked source of the hierarchy is consumed prior to energy produced by a lesser ranked source of the hierarchy, and wherein the hierarchy is dynamically adjustable on an hourly basis, and
    the data center computing platform itself is selected by the mining optimization model based on a movement of the sun, processing capacity, available energy sources, energy pricing information, downtime, and outage information, and
  a cost of the amount of energy from the energy mix is less than a cost of an amount of energy from other energy sources available to the data center computing platform; and
send, to the data center computing platform, one or more commands directing the data center computing platform to process the first cryptocurrency request using the energy mix, wherein sending the one or more commands directing the data center computing platform to process the first cryptocurrency request causes the data center computing platform to process the first cryptocurrency request using the energy mix; and
send, to a user device of a first user associated with the first cryptocurrency request, a graphical user interface including user specific statistics including an amount of energy saved in comparison to other cryptocurrency transactors in a region of the first user, a cost savings of the first user in comparison to the other cryptocurrency transactors, and a ranking of how earth friendly the first user is based on their use of green energy in comparison to fossil fuels when processing the first cryptocurrency request, wherein the user specific statistics are displayed as part of a social network for the first user and the other cryptocurrency transactors, and wherein the graphical user interface further includes an amount of non-fungible tokens, presented to the first user, based on the amount of energy saved.

2. The computing platform of claim 1, wherein the memory stores additional computer-readable instructions that, when executed by the one or more processors, further cause the computing platform to:
  train the mining optimization model, wherein training the mining optimization model comprises inputting, into the mining optimization model, one or more of: historical gas prices, historical KPIs, historical energy pricing information, weather information, climate information, energy preference information, and available energy sources.

3. The computing platform of claim 2, wherein the one or more energy sources comprise different types of energy sources.

4. The computing platform of claim 1, wherein the memory stores additional computer-readable instructions that, when executed by the one or more processors, further cause the computing platform to:
  update, by inputting user feedback and the energy mix into the mining optimization model, the mining optimization model.

5. The computing platform of claim 1, wherein the memory stores additional computer-readable instructions that, when executed by the one or more processors, further cause the computing platform to:
  identify that an accuracy level of the mining optimization model has reached a threshold accuracy level; and
  based on identifying that the accuracy level has reached the threshold accuracy level, halt updates to the mining optimization model until the accuracy level falls below the threshold accuracy level.

6. The computing platform of claim 1, wherein the memory stores additional computer-readable instructions that, when executed by the one or more processors, further cause the computing platform to:
  receive, from a user device, an energy mix preference input specifying the one or more energy sources to be included in the energy mix, wherein user selection of a particular energy source via a display of the user device causes a backend table of preferred energy sources for the corresponding user to be updated so as to include the particular energy source.

7. The computing platform of claim 1, wherein the KPIs include one or more of: time sensitivity, necessary processing power, and value.

8. The computing platform of claim 1, wherein:
  the first cryptocurrency request is initiated on a distributed ledger corresponding to a cryptocurrency identified in the first cryptocurrency request, and
  processing the first cryptocurrency request causes the first cryptocurrency request to be included as a permanent entry in the distributed ledger, wherein including the permanent entry comprises adding a new entry to the distributed ledger.

9. The computing platform of claim 1, wherein the first cryptocurrency request includes a specified request priority level, and wherein a transactor profile of a transactor corresponding to the first cryptocurrency request indicates different gas prices, acceptable to the transactor, based on different request priority levels.

10. The computing platform of claim 9, wherein the gas price is less than a predetermined gas price corresponding to the specified request priority level.

11. The computing platform of claim 1, wherein the first cryptocurrency request is initiated within a cryptocurrency wallet application corresponding to both a transactor of the first cryptocurrency request and one or more potential miners for the first cryptocurrency request.

12. The computing platform of claim 11, wherein the cryptocurrency wallet application includes published gas price ranges and corresponding KPIs for the one or more potential miners.

13. The computing platform of claim 12, wherein a miner of the one or more potential miners is automatically selected for the first cryptocurrency request based on the gas price range for the miner and the KPIs of the first cryptocurrency request.

14. The computing platform of claim 1, wherein the hierarchy is further adjusted based on a movement of the sun.

15. The computing platform of claim 1, wherein the energy mix of the one or more energy sources includes a first percentage corresponding to a wind energy source and a second percentage corresponding to a solar energy source.

16. The computing platform of claim 1, wherein the graphical user interface further indicates carbon credits, presented to the first user, based on the amount of energy saved.

17. The computing platform of claim 1, wherein the graphical user interface further includes where the energy mix is being sourced and a percentage of the energy mix coming from non-renewables versus renewable energy sources.

18. A method comprising:
at a computing platform comprising at least one processor, a communication interface, and memory:
receiving a first cryptocurrency request indicating a gas price and key performance indicators (KPIs) of the first cryptocurrency request;
inputting the gas price and the KPIs into a mining optimization model, wherein inputting the gas price and the KPIs into the mining optimization model causes the mining optimization model to output an energy mix for use in processing the first cryptocurrency request, wherein:
the energy mix indicates one or more energy sources, capable of providing an amount of energy needed to process the first cryptocurrency request and used to support operation of a data center computing platform configured to process cryptocurrency requests, wherein the energy mix includes a hierarchy of the one or more energy sources, wherein:
energy produced by a highest ranked source of the hierarchy is consumed prior to energy produced by a lesser ranked source of the hierarchy, and wherein the hierarchy is dynamically adjustable on an hourly basis, and
the data center computing platform itself is selected by the mining optimization model based on a movement of the sun, processing capacity, available energy sources, energy pricing information, downtime, and outage information, and
a cost of the amount of energy from the energy mix is less than a cost of an amount of energy from other energy sources available to the data center computing platform; and
sending, to the data center computing platform, one or more commands directing the data center computing platform to process the first cryptocurrency request using the energy mix, wherein sending the one or more commands directing the data center computing platform to process the first cryptocurrency request cause the data center computing platform to process the first cryptocurrency request using the energy mix; and
sending, to a user device of a first user associated with the first cryptocurrency request, a graphical user interface including user specific statistics including an amount of energy saved in comparison to other cryptocurrency transactors in a region of the first user, a cost savings of the first user in comparison to the other cryptocurrency transactors, and a ranking of how earth friendly the first user is based on their use of green energy in comparison to fossil fuels when processing the first cryptocurrency request, wherein the user specific statistics are displayed as part of a social network for the first user and the other cryptocurrency transactors, and wherein the graphical user interface further includes an amount of non-fungible tokens, presented to the first user, based on the amount of energy saved.

19. The method of claim 18, further comprising:
training the mining optimization model, wherein training the mining optimization model comprises inputting, into the mining optimization model, one or more of: historical gas prices, historical KPIs, historical energy pricing information, weather information, climate information, energy preference information, and available energy sources.

20. One or more non-transitory computer-readable media storing instructions that, when executed by a computing platform comprising at least one processor, a communication interface, and memory, cause the computing platform to:
receive a first cryptocurrency request indicating a gas price and key performance indicators (KPIs) of the first cryptocurrency request;
input the gas price and the KPIs into a mining optimization model, wherein inputting the gas price and the KPIs into the mining optimization model causes the mining optimization model to output an energy mix for use in processing the first cryptocurrency request, wherein:
the energy mix indicates one or more energy sources, capable of providing an amount of energy needed to process the first cryptocurrency request and used to support operation of a data center computing platform configured to process cryptocurrency requests, wherein:
the energy mix includes a hierarchy of the one or more energy sources, wherein energy produced by a highest ranked source of the hierarchy is consumed prior to energy produced by a lesser ranked source of the hierarchy, and wherein the hierarchy is dynamically adjustable on an hourly basis, and
the data center computing platform itself is selected by the mining optimization model based on a movement of the sun, processing capacity, available energy sources, energy pricing information, downtime, and outage information, and
a cost of the amount of energy from the energy mix is less than a cost of an amount of energy from other energy sources available to the data center computing platform; and
send, to the data center computing platform, one or more commands directing the data center computing platform to process the first cryptocurrency request using the energy mix, wherein sending the one or more commands directing the data center computing platform to process the first cryptocurrency request cause the data center computing platform to process the first cryptocurrency request using the energy mix; and
send, to a user device of a first user associated with the first cryptocurrency request, a graphical user interface including user specific statistics including an amount of energy saved in comparison to other cryptocurrency transactors in a region of the first user, a cost savings of the first user in comparison to the other cryptocurrency transactors, and a ranking of how earth friendly the first user is based on their use of green energy in comparison to fossil fuels when processing the first cryptocurrency request, wherein the user specific statistics are displayed as part of a social network for the first user and the other cryptocurrency transactors, and wherein the graphical user interface further includes an amount of non-fungible tokens, presented to the first user, based on the amount of energy saved.

\* \* \* \* \*